US007083856B2

(12) United States Patent
Rajagopalan et al.

(10) Patent No.: US 7,083,856 B2
(45) Date of Patent: Aug. 1, 2006

(54) NON-IONIC FLUOROPOLYMER INNER LAYER WITH IMPROVED ADHESION

(75) Inventors: Murali Rajagopalan, South Dartmouth, MA (US); Pamela V. Arnold, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 30 days.

(21) Appl. No.: 10/817,366

(22) Filed: Apr. 2, 2004

(65) Prior Publication Data

US 2004/0192833 A1 Sep. 30, 2004

Related U.S. Application Data

(63) Continuation-in-part of application No. 10/171,355, filed on Jun. 13, 2002, now Pat. No. 6,747,110.

(51) Int. Cl.
*A63B 37/12* (2006.01)
*A63B 37/00* (2006.01)

(52) U.S. Cl. .................. 428/422; 428/421; 427/302; 473/374; 473/376

(58) Field of Classification Search ............. 427/302; 428/421, 422; 473/374, 376
See application file for complete search history.

(56) References Cited

U.S. PATENT DOCUMENTS

| 4,138,426 | A | | 2/1979 | England ............... 260/465.6 |
|---|---|---|---|---|
| 4,323,603 | A | * | 4/1982 | Close ..................... 524/545 |
| 4,452,998 | A | | 6/1984 | Griffith et al. ............ 560/221 |
| 5,426,165 | A | | 6/1995 | Kruger et al. ............. 526/247 |
| 5,654,373 | A | | 8/1997 | Kruger et al. ........... 525/326.3 |
| 5,820,488 | A | | 10/1998 | Sullivan et al. ........... 473/374 |
| 5,885,172 | A | | 3/1999 | Hebert et al. ............. 473/354 |
| 5,962,140 | A | | 10/1999 | Rajagopalan ............. 428/421 |
| 5,981,654 | A | | 11/1999 | Rajagopalan .............. 525/66 |
| 5,981,673 | A | | 11/1999 | DeSimone et al. ........... 526/89 |
| 6,132,324 | A | | 10/2000 | Hebert et al. ............. 473/378 |
| 6,133,389 | A | | 10/2000 | Anolick et al. ............ 526/206 |
| 6,162,135 | A | | 12/2000 | Bulpett et al. ............ 473/373 |
| 6,177,196 | B1 | | 1/2001 | Brothers et al. ........... 428/422 |
| 6,210,294 | B1 | | 4/2001 | Wu ........................ 473/377 |
| 6,217,464 | B1 | | 4/2001 | Chang .................... 473/378 |
| 6,232,389 | B1 | | 5/2001 | Feeney et al. ............ 524/450 |
| 6,232,400 | B1 | | 5/2001 | Harris et al. ............. 525/176 |
| 6,274,669 | B1 | | 8/2001 | Rajagopalan .............. 525/64 |
| 6,287,216 | B1 | | 9/2001 | Boehm ................... 473/354 |
| 6,291,592 | B1 | | 9/2001 | Bulpett et al. ............ 525/248 |
| 6,300,445 | B1 | | 10/2001 | Huang et al. ............. 526/248 |
| 6,371,870 | B1 | | 4/2002 | Calabria et al. ........... 473/370 |
| 6,392,002 | B1 | | 5/2002 | Wu ........................ 528/76 |
| 6,747,110 | B1 | * | 6/2004 | Rajagopalan ............. 526/254 |
| 2003/0004013 | A1 | * | 1/2003 | Lutz et al. ............... 473/374 |
| 2003/0181601 | A1 | * | 9/2003 | Hogge et al. ............. 525/397 |
| 2003/0236353 | A1 | * | 12/2003 | Rajagopalan ............. 525/199 |

OTHER PUBLICATIONS

"Teflon Typical Properties" TEFLON Product Literature, DuPont.*
"Fluoropolymers Types and Features" Daikin Product Literature.*

* cited by examiner

*Primary Examiner*—David J. Buttner
(74) *Attorney, Agent, or Firm*—William B. Lacy

(57) ABSTRACT

A golf ball including a core having a first outer surface; a cover; and an intermediate layer disposed between the core and the cover, the intermediate layer including a non-ionic hydrophobic stiff fluoropolymer having a surface energy of less than about 75 dyne/cm$^2$ and having a second outer surface; wherein at least one of the first or second outer surfaces are treated with an functional silane such that a sufficient number of surface amine, hydroxyl, carboxylic acid, or epoxy groups are available for binding to an adjacent layer.

27 Claims, No Drawings

NON-IONIC FLUOROPOLYMER INNER LAYER WITH IMPROVED ADHESION

CROSS REFERENCE TO RELATED APPLICATIONS

This application is a continuation-in-part of U.S. application Ser. No. 10/171,355, filed Jun. 13, 2002 now U.S. Pat. No. 6,747,110.

FIELD OF THE INVENTION

This invention relates generally to golf balls, and more specifically, to a multi-layer golf ball including at least one non-ionic fluoropolymer inner layer.

BACKGROUND OF THE INVENTION

Solid core golf balls are well known in the art. Typically, the core is made from polybutadiene rubber material that provides the primary source of resiliency for the golf ball. A known drawback of polybutadiene cores cross-linked with peroxide and/or zinc diacrylate is the adverse effect of the absorption of water vapor, which can degrade the performance of the core material, in particular resilience.

Prolonged exposure to water vapor (i.e., at high humidity) and elevated temperature may be sufficient to allow the water vapor to invade polybutadiene cores. For example, at 38° C. and 90% humidity over a sixty-day period, a sufficient amount of moisture permeates the core to reduce the initial velocity of the golf ball by about 1.8–4.0 ft/s, sometimes greater. The change in compression may be reduced by 5% or more. Absorbed water vapor can also reduce golf ball coefficient of restitution ("COR"). When a golf ball is subjected to prolonged storage and/or use under humid conditions (i.e., 25–35% relative humidity), or conditions exhibiting a combination of high temperature and humidity, the COR of the golf ball decreases over time due to water vapor absorption.

Therefore, cores of this nature must be covered quickly to maintain optimum ball properties. A cover that protects the core from the elements and repeated impacts from golf clubs is typically made from ionomer resins, balata, or urethane, among other materials. Ionomer covers, particularly hard ionomers, offer some protection against the absorption of water vapor. However, it is more difficult to control or impart spin to balls with these types of covers. Urethane covers can provide better ball control but offer less resistance to water vapor than do ionomer covers. Several prior patents have addressed the water vapor absorption problem. These include U.S. Pat. Nos. 5,820,488; 5,885,172; 6,132,324; 6,232,389; and 6,287,216, which are incorporated by reference herein, in their entirety. Manufacturers have typically resorted to the incorporation of a WVB material in an existing layer or a designated WVB layer to overcome the water vapor absorption problem in golf balls, escalating manufacturing cost and construction complexity. It is therefore desirable to provide cost-effective material compositions that have general characteristics suitable for golf ball constructions with concomitant WVB properties.

One particular class of polymers suitable for golf ball compositions of the present invention is fluoropolymers. Fluoropolymers are well known for their excellent resistance to outdoor weathering and ultraviolet irradiation, high degree of physical toughness, chemical inertness, water and gas impermeability, low moisture absorption, good abrasion resistance, non-tackiness, resistance to soiling, as well as a significant retention of these properties at both low and elevated temperatures. This rare combination is due to the strength of the C—F bond, one of the most stable bonds known. Other desirable properties of the fluoropolymers include high elongation, low coefficient of friction, low wear rate, good resistance to swell in solvents, low refractive index, and low dielectric constant. These desirable properties allow the fluoropolymers to be widely used as self-supporting layers or outer coatings on various substrates. Disclosures of fluoropolymer applications in golf ball compositions, however, are limited, and include U.S. Pat. Nos. 5,962,140; 6,133,389; and 6,217,464, which are incorporated by reference herein, in their entirety.

The major hindrance to the use of fluoropolymers for golf ball layers is their poor adhesion (and, hence, the reason why they excel for use in non-stick cookware), especially when formed as a very rigid layer. Rigid layers are sometimes preferred when layer thickness is very thin, such that the properties of the layer are still an integral part of golf ball performance. In general, the more rigid a fluoropolymer layer is, the more difficult it is to manufacture in a manner that resists layer breakage and cracking due to poor adhesion.

Because most polymers containing fluorine atoms have difficult adhesive properties, there remains a need for further development of golf ball compositions comprising fluoropolymers, particularly non-ionic hydrophobic stiff ("NIHS") fluoropolymers, in multi-layer golf ball constructions, preferably inner cover layers, in combination with surface chemistry modifiers of polybutadiene core chemistry.

SUMMARY OF THE INVENTION

The present invention is directed to a golf ball including a core having a first outer surface; a cover; and an intermediate layer disposed between the core and the cover, the intermediate layer including a non-ionic hydrophobic stiff fluoropolymer having a surface energy of less than about 75 dyne/cm$^2$ and having a second outer surface; wherein at least one of the first or second outer surfaces are treated with an functional silane such that a sufficient number of surface amine, hydroxyl, carboxylic acid, or epoxy groups are available for binding to an adjacent layer.

In a preferred embodiment, the functional silane is an aminosilane that forms surface amine groups for binding. The non-ionic hydrophobic stiff fluoropolymer should have a surface energy of less than about 50 dyne/cm$^2$, preferably less than about 40 dyne/cm$^2$.

The non-ionic hydrophobic stiff fluoropolymer can be formed from any suitable material, but is preferably a homopolymer, copolymer, or terpolymer formed from a polymerization of one or more non-ionic fluoromonomers. Additionally, the intermediate layer may also include a thermoplastic material including polyesterester block copolymers, polyetherester block copolymers, polyetheramide block copolymers, partially or fully neutralized ionomer resins, dynamically vulcanized thermoplastic elastomers, hydrogenated styrene-butadiene elastomers with functional groups attached, thermoplastic polyurethanes, thermoplastic polyesters, metallocene polymers; styrene-propylene-diene rubbers; polybutadienes; chloroprene rubbers; acrylonitrile rubbers; acrylonitrile-butadiene rubbers; ethylene/propylene/diene terpolymers; polypropylene resins; epoxy; polyurea; styrene-ethylene block copolymers; maleic anhydride or succinate modified metallocene catalyzed ethylene copolymers; chlorinated polyethylenes; polysulfide rubbers; fluorocarbons; or polymethylmethacrylate.

In one embodiment, the adjacent layer is the core or the cover. The non-ionomeric fluoropolymer preferably has a material hardness between about 25 and about 75 Shore D, and the non-ionomeric fluoropolymer of the intermediate layer preferably has a hardness of between about 50 and about 70 Shore D. The intermediate or cover layer can have a thickness between about 0.005 inches and about 0.085 inches, preferably between about 0.030 inches and about 0.060 inches. The golf ball has an outer diameter between about 1.500 inches and about 1.650 inches, preferably between about 1.550 inches and about 1.640 inches. The intermediate layer has a specific gravity of about 1.1 to about 1.8 in the absence of a density-adjusting filler, preferably from about 1.3 to about 1.6.

In another embodiment, the core includes a center and at least one outer core layer. The center can be solid, hollow, liquid-filled, gel-filled, or gas-filled. In a preferred embodiment, the aminosilane includes γ-aminopropyltriethoxysilane; γ-aminopropyltriethoxysilane; γ-aminopropyltriethoxysilane; aminoalkyl silicone solution; modified aminoorganosilane; γ-aminopropyltrimethoxysilane; n-β-(aminoethyl)-γ-aminopropyltrimethoxysilane; modified aminoorganosilane (40% in methanol); modified aminosilane (50% in methanol); triaminofunctional silane; bis-(γ-trimethoxysilylpropyl)amine; n-phenyl-γ-aminopropyltrimethoxysilane; organomodified polydimethylsiloxane; polyazamide silane (50% in methanol); or n-β-(aminoethyl)-γ-aminopropylmethyldimethoxysilane. Most preferably, the aminosilane is n-β-(aminoethyl)-γ-aminopropyltrimethoxysilane.

The cover can include a castable or non-castable thermoplastic or thermosetting material comprising partially- or fully-neutralized ionomer resins; epoxy; polyurethanes comprising polyols and polyisocyanates; balata; vinyl resins; polyolefins; polyureas; polyamides; acrylic resins and blends thereof; block copolymers; copoly(ether-amide); polyphenylene oxide resins and blends thereof; thermoplastic polyesters; blends and alloys including polycarbonate with acrylonitrile butadiene styrene and polyvinyl chloride with acrylonitrile butadiene styrene; blends of thermoplastic rubbers with polyethylene and propylene; or a mixture thereof.

Additionally, the core should have a Shore D hardness of less than about 60. The cover may also include at least one additive including antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; or a mixture thereof. In one preferred embodiment, the non-ionic hydrophobic stiff fluoropolymer has a water absorption at 20° C. immersion for 24 hr of no greater than about 0.07%.

The present invention is also directed to a golf ball including a core having a first outer surface; a cover; and an intermediate layer disposed between the core and the cover, the intermediate layer including a non-ionic hydrophobic stiff fluoropolymer having a surface energy of less than about 55 dyne/cm2, a water absorption at 20° C. immersion for 24 hr of less than about 0.1%, and having a second outer surface; wherein at least one of the first or second outer surfaces are treated with an aminosilane such that a sufficient number of surface amine groups are present and result in the treated layer having a peel strength of at least about 5 lb/in.

Preferably, the peel strength is at least about 10 lb/in, more preferably the peel strength is at least about 15 lb/in.

In one embodiment, the aminosilane includes γ-aminopropyltriethoxysilane; γ-aminopropyltriethoxysilane; γ-aminopropyltriethoxysilane; aminoalkyl silicone solution; modified aminoorganosilane; γ-aminopropyltrimethoxysilane; n-β-(aminoethyl)-γ-aminopropyltrimethoxysilane; modified aminoorganosilane (40% in methanol); modified aminosilane (50% in methanol); triaminofunctional silane; bis-(γ-trimethoxysilylpropyl)amine; n-phenyl-γ-aminopropyltrimethoxysilane; organomodified polydimethylsiloxane; polyazamide silane (50% in methanol); or n-β-(aminoethyl)-γ-aminopropylmethyldimethoxysilane.

The present invention is further directed to a golf ball comprising a core having a first outer surface; a cover; and an intermediate layer disposed between the core and the cover, the intermediate layer comprising a non-ionic hydrophobic stiff fluoropolymer having a surface energy of no greater than about 55 dyne/cm2, a coefficient of friction of less than about 0.55, and having a second outer surface; wherein at least one of the first or second outer surfaces are treated with n-β-(aminoethyl)-γ-aminopropyltrimethoxysilane in an amount sufficient to result in a peel strength between treated layers of at least about 10 lb/in. Preferably, the coefficient of friction is less than about 0.45.

DEFINITIONS

The following terms that are used in this application are defined in terms of the enumerated ASTM tests: Specific Gravity ASTM D-792 (temperature was controlled to 20–23° C.); Flexural Modulus ASTM D-790 and ASTM D6272-02 (50% R.H., 23° C., not less than 40 hr); Shore D Hardness ASTM D-2240; Coefficient of Friction ASTM D 1894 at 73° F.; and Shore C Hardness ASTM D-2240.

As used herein, the terms "points" and "compression points" refer to the compression scale or the compression scale based on the ATTI Engineering Compression Tester. This scale, which is well known to those working in this field, is used in determining the relative compression of a core or ball.

As used herein, "COR" refers to Coefficient of Restitution, which is obtained by dividing a ball's rebound velocity by its initial (i.e., incoming) velocity. This test is performed by firing the samples out of an air cannon at a vertical steel plate over a range of test velocities (from 75 to 150 ft/s). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft/s.

As used herein, the terms "fluoropolymer" and "fluorinated polymer" is defined as any thermoplastic and/or elastomeric homopolymer, copolymer, terpolymer, or mixture thereof, having at least one fluorine in at least one of the monomer repeat units in the polymer.

As used herein, the terms "fluoromonomer" and "fluorinated monomer" refer to compounds containing an ethylinic group that may be free-radically polymerized and that contain at least one fluorine atom, fluoroalkyl group, or fluoroalkoxy group attached to the ethylinic group that undergoes polymerization.

As used herein, the term "copolymer" refers to a polymer which is formed from two or more monomers, wherein the monomers are not identical.

As used herein, the term "terpolymer" refers to a polymer which is formed from three monomers, wherein the monomers are not identical.

As used herein, the term "fillers" includes any compound or composition that can be used to vary the density and other properties of the subject golf ball cores.

As used herein, the term "pph" in connection with a batch formulation refers parts by weight of the constituent per hundred parts of the base composition (e.g., elastomer).

The term "about," as used herein in connection with one or more numbers or numerical ranges, should be understood to refer to all such numbers, including all numbers in a range.

DETAILED DESCRIPTION OF THE INVENTION

The golf balls of the present invention may comprise any of a variety of constructions, such as a two-piece, three-piece, multi-layer, or wound ball having a variety of cores, intermediate layers, covers, and coatings. The covers and cores of the present invention include structures comprising one or more layers. Cores may include a single, unitary layer, comprising the entire core from the center of the core to its outer periphery, or may contain a center surrounded by at least one outer core layer. The center, the innermost portion of the core, is preferably solid, but may be hollow or liquid-, gel-, or gas-filled. The outer core layer may also be a wound layer formed of a tensioned elastomeric material. Cover layers of the present invention may also contain one or more layers, such as a double cover comprising an inner and outer cover layer. Optionally, an intermediate layer disposed between the core and cover may be incorporated. The intermediate layer, if present, may comprise one or more layers, such as inner cover layers, outer core layers, or mantle layers.

Any of the core, cover, or the intermediate layer components may be formed of or include a NIHS polymer, but preferably, at least one of the outer core layer, intermediate layer, inner cover layer, or outer cover layer comprises a NIHS fluoropolymer.

The NIHS fluoropolymer may be a homopolymer, a copolymer, a terpolymer, or a mixture thereof that comprises at least one non-ionomeric fluoromonomer. Preferably, the NIHS fluoropolymer of the present invention has a formula:

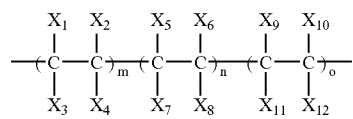

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the NIHS fluoropolymer; n ranges from 0 to 50 percent by weight of the NIHS fluoropolymer; and o ranges from 0 to 35 percent by weight of the NIHS fluoropolymer.

Non-ionomeric fluoromonomers of the present invention typically are partially fluorinated and perfluorinated ethylenic monomers. Examples of such fluoromonomers include, but are not limited to, partially fluorinated and perfluorinated olefins of from about 1 to about 12 carbon atoms such as vinylidene fluoride ("VDF"); vinyl fluoride ("VF"), hexafluoropropylene ("HFP"); pentafluoropropylene ("PFP"); tetrafluoropropylene; trifluoropropylene ("TFP"); difluoropropylene; tetrafluoroethylene ("TFE"); trifluoroethylene; 1,2-difluoroethylene; chlorotrifluoroethylene ("CTFE"); 1,2-dichlorodifluoroethylene; 1-chloro-1-fluoroethylene; perfluorobutyl ethylene ("PFBE"); fluorinated alkyl α-olefins such as 3,3,3,4,4-pentafluoro-1-butene; 3,3,3-trifluoropropene; 1-hydropentafluoropropene; 2-hydropentafluoropropene; 2-trifluoromethyl-3,3,3-trifluoro-1-propene; fluorinated vinyl ethers of from about 1 to about 8 carbon atoms such as perfluoro(methylvinylether) ("PMVE"); perfluoro(ethylvinylether) ("PEVE"); perfluoro (propylvinylether) ("PPVE"); perfluorodioxoles of from about 1 to about 10 carbon atoms such as perfluoro(1,3-dioxole) and perfluoro(2,2-dimethyl-1,3-dioxole) ("PDD"); partially fluorinated and perfluorinated dienes of from about 1 to about 8 carbon atoms such as fluorinated derivatives of 1,4-butadiene and cis-isoprene; perfluoralkoxy ("PFA"); fluorosilicons; perfluorocyclics; fluorinated acrylics such as 1,1-dihydropentadecafluorooctylacrylate and 1,1-dihydropentadienefluorooctylacrylate; and mixtures thereof. Other suitable fluoromonomers for the invention are described in U.S. Pat. Nos. 6,177,196; 5,981,673; 5,654,373; 5,426,165; 4,138,426; and 4,452,998, the disclosures of which are incorporated herein by reference in their entirety.

The non-ionomeric fluoromonomers enlisted above may be polymerized alone to form a NIHS homopolymer if the fluoromonomer can be homopolymerized. Alternatively, the non-ionomeric fluoromonomer may be polymerized with one or more other fluoromonomers or other fluorine-free monomers to form a copolymer, or terpolymer. Suitable fluorine-free monomers include without limitation substituted and unsubstituted olefins of from about 1 to about 12 carbon atoms such as ethylene and propylene and isobutylene; vinyl esters of from about 1 to about 12 carbon atoms such as vinyl acetate and vinylpropionate; dienes of from about 1 to about 8 carbon atoms such as 1,4-butadiene and cis-isoprene; and mixtures thereof. A preferred NIHS homopolymer for the invention is polyvinylidene fluoride ("PVDF"), a preferred NIHS copolymer is VDF-HFP copolymer, and a preferred NIHS terpolymer is VDF-HFP-TFE terpolymer.

The NIHS fluoropolymers of this invention may include any cure site monomers and their halogenated derivatives commonly used in fluoropolymers, including but not limited to the non-ionomeric fluoromonomers listed above and derivatives thereof, as well as brominated and iodinated olefins such as 4-bromotetrafluorobutene-1, bromotrifluoroethylene, 4-iodotetrafluorobutene-1, and iodotrifluoroethylene. The NIHS fluoropolymer may further be blended with ionomeric fluoropolymers of U.S. Pat. Nos. 6,300,445 and 5,962,140, the disclosures of which are incorporated herein by reference in their entirety. Other additives may also be added to the NIHS fluoropolymer to enhance processability or various physical properties, such as tensile strength, flexural modulus, or water resistance. As known to one of ordinary skill in the art, such additives include without limitation chain transfer agents, peroxide curatives, amine curatives, bisphenol curatives, cross-linking agents, redox initiators, co-curing agents, dispersion fillers, density-modifying fillers, foaming agents, antioxidants, reinforcing agents, plasticizers, lubricants, processing aids, pigments and dyes, and mixtures thereof.

Most of the above mentioned NIHS fluoropolymers are commercially available or can be prepared by methods well known in the art. For example, Atofina Chemicals, Inc. supplies VDF homopolymers under the trademark of Kynar® PVDF, VDF-HFP copolymers under the trademarks of Kynar Flex® and Kynar SuperFlex®, fluorinated acrylic copolymers under the trademark of Foraperle®, and CTFE homopolymers under the trademark of Voltalef®. E.I. Dupont de Nemours & Company produces TFE homopolymers under the trademark of Teflon® PTFE, TFE-PPVE copolymers under the trademark of Teflon® NXT, ethylene-TFE copolymer under the trademark of Tefzel® ETFE, TFE-HFP copolymers under the trademark of Teflon® FEP, fluoroelastomers such as VDF-HFP copolymers under the trademark of Viton®, PFA copolymers under the trademark of Teflon® PFA, perfluorocyclopolymers under the trademark of Teflon® AF, and perfluoroelastomers under the trademark of Kalrez®. 3M provides VDF-HFP copolymers and VDF-HFP-TFE terpolymers under the trademark of Dyneon®. Ausimont supplies VDF homopolymers under the trademark of Hylar®, VDF-HFP copolymers and VDF-HFP-TFE terpolymers under the trademark of Tecnoflon®, ethylene-CTFE copolymers under the trademark of Halar®, modified ethylene-CTFE under the trademark of Vatar®, TFE-PFA copolymers and PFA homopolymers under the trademark of Hyflon®, and TFE homopolymers under the trademarks of Algoflon® and Polymist®. Daikin Industries, Ltd. produces VDF homopolymers under the trademark of Neoflon® PVDF, VDF-HFP copolymers and VDF-HFP-TFE terpolymers under the trademark of Dai-El®, TFE homopolymers under the trademark of Polyflon® PTFE, TFE-PAVE copolymers under the trademark of Neoflon® PFA, TFE-HFP copolymers under the trademark of Neoflon® V FEP, and CTFE homopolymers under the trademark of Neoflon® PCTFE. Asahi Glass Company manufactures ethylene-TFE copolymers, TFE homopolymers, and PFA homopolymers under the trademark of Fluon®, FEVE alternating copolymers under the trademark of Lumiflon®, propylene-TFE alternating copolymers under the trademark of Aflas®, and amorphous perfluorocyclopolymers under the trademark of Cytop®. Other commercial NHS fluoropolymers include TFE-based fluoropolymers the trademarks of Lubriflon® and Valflon® available from Dixon Resine. Preferably the NIHS fluoropolymers for the present invention are VDF homopolymers and VDF-HFP copolymers available from Atofina Chemicals, Inc. under the trademark of Kynar Flex®. Specific examples and their properties are listed in Table I below.

thermoplastic elastomers, hydrogenated styrene-butadiene elastomers with functional groups such as maleic anhydride or sulfonic acid attached, thermoplastic polyurethanes, thermoplastic polyesters, polymers formed using a metallocene catalyst ("metallocene polymers"); styrene-propylene-diene rubbers; polybutadienes; chloroprene rubbers; acrylonitrile rubbers; acrylonitrile-butadiene rubbers; EPDM; polypropylene resins; epoxy; polyureas; styrene-ethylene block copolymers; maleic anhydride or succinate modified metallocene catalyzed ethylene copolymers; chlorinated polyethylenes; polysulfide rubbers; fluorocarbons such as hexafluoroacetone; polymethylmethacrylate ("PMMA"), and blends thereof. Any of these materials having one or more acidic or ionic moieties may be partially or fully neutralized, preferably by at least about 40%, more preferably by at least about 70%, and most preferably by about 100%.

Suitable thermoplastic polyetheresters include Hytrel® 3078, G3548W and G4078W from E. I. du Pont de Nemours and Company. Suitable thermoplastic polyetheramides include Pebax® 2533, 1205 and 4033 from Atofina Chemicals, Inc. Suitable thermoplastic ionomer resins include any number of olefinic based ionomers such as Surlyn® and Iotek®. Suitable dynamically vulcanized thermoplastic elastomers include Santoprene®, Sarlink®, Vyram®, Dytron®, and VistaFlex®. Examples of suitable functionalized hydrogenated styrene-butadiene elastomers having functional groups such as maleic anhydride or sulfonic acid, include Kraton® FG-1901x and FG-1921x from Shell Corporation. Examples of suitable thermoplastic polyurethanes include Estane® 58133, 58134 and 58144 from B.F. Goodrich Company. Suitable metallocene-catalyzed polymers include those commercially available from Sentinel Products. Suitable thermoplastic polyesters include poly(butylene terephthalate), poly(ethylene terepthalate), and poly(trimethylene terepthalate). Preferably the thermoplastic material of the intermediate layer composition is a polyetherester block copolymer, with Hytrel® 3078 being a particularly preferred polyetherester block copolymer.

In accordance to the present invention, the NIHS fluoropolymer homopolymers, copolymers and terpolymers described herein may be used in forming any golf ball component layers such as outer core layers and intermediate layers, as well as in covers, including inner and outer cover layers. The intermediate layers of the present invention are formed from an intermediate layer composition comprising up to 100% by weight of a NIHS fluoropolymer. In one

TABLE I

Physical and mechanical properties of Kynar Flex ® PVDF

| Properties | Series 2500 | Series 2750/ 2950 | Series 2800/2900 | Series 2850 | Series 3120 |
|---|---|---|---|---|---|
| Specific Gravity | 1.80–1.82 | 1.78–1.80 | 1.76–1.79 | 1.76–1.79 | 1.76–1.79 |
| Water Absorption (%) | 0.04–0.07 | 0.04–0.07 | 0.03–0.05 | 0.03–0.05 | 0.03–0.05 |
| Flexural Modulus (psi) | 28,000–36,000 | 49,000–58,000 | 90,000–120,000 | 160,000–180,000 | 90,000–120,000 |
| Hardness (Shore D) | 55–60 | 62–67 | 65–70 | 70–75 | 65–70 |

In one embodiment of the present invention, the intermediate layer is formed from a composition comprising at least one NIHS fluoropolymer described above and a thermoplastic material. Suitable thermoplastic materials for use in the intermediate layer composition include, but are not limited to, polyesterester block copolymers, polyetherester block copolymers, polyetheramide block copolymers, partially or fully neutralized ionomer resins, dynamically vulcanized embodiment of the present invention, the intermediate layer is formed from a composition of about 1% to about 99% by weight of a NIHS fluoropolymer, about 0% to about 75% by weight of a thermoplastic as describe above, and about 0% to about 50% by weight of a density-modifying filler such as zinc oxide. In another embodiment, the intermediate layer is formed from a composition of about 10% to about 75% by weight of a NIHS fluoropolymer, about 0% to about 25% by weight of a thermoplastic, and about 5% to about 40% by weight of zinc oxide. Most preferably, the intermediate layer of the present invention comprises about 100% of a NIHS fluoropolymer.

The coefficient of friction of the NIHS layers of the present invention should be very low, preferably less than about 0.55, more preferably less than about 0.45. The coefficient of friction ("COF") is determined by the ease with which two surfaces slide against each other. The dimensionless value of the coefficient of friction is the ratio of the force required to slide the surfaces to the force perpendicular to the surfaces. A lower COF indicates that the surfaces are slicker—there is less resistance to the sliding motion. Polymers are usually tested dry (no additional lubricant) against polished steel using a thrust washer geometry. The value obtained for the friction coefficient will depend on both the load (pressure or perpendicular force applied) and the velocity. The friction coefficient is also a function of both surfaces, although polymer testing is almost always tested versus polished steel and result is then reported as an attribute of the polymer.

Surface energies of the NIHS layers of the present invention are preferably less than about 75 dyne/cm$^2$, more preferably less than about 50 dyne/cm$^2$, and most preferably less than about 40 dyne/cm$^2$. The surface energy of polymers is typically measured using an interfacial tensiometer method that employs, for example, a Camtel® CDCA-100 instrument, a versatile computer-controlled tensiometer capable of measuring surface tensions and contact angles and calculating surface energies. The method generally involves dipping the polymer into and retracting it from a liquid of known surface tension. The variation of contact angle with immersion depth is measured and these values are used to calculate the surface energy of the polymer. The CDCA-100 has a circulating jacket for temperature control when connected to an external bath and an in-built magnetic stirrer.

It is preferred that the NIHS fluoropolymer used in the intermediate layers of the present invention has a flexural modulus of greater than about 10,000 psi, more preferably between about 30,000 psi and about 150,000 psi and, most preferably, between about 55,000 psi and about 75,000 psi. This is particularly desirable when the intermediate layer is an inner cover layer for a golf ball with a double-cover construction. Additionally, it is preferred that the NIHS fluoropolymer has a Shore D hardness of between about 25 and about 75 and, more preferably, between about 50 and about 70. NIHS fluoropolymers of this nature include Kynar Flex® Series 2750 and 2800 from Atofina Chemicals, Inc.

The intermediate layers employed in the golf balls of the present invention preferably have a thickness from about 0.005 inches to about 0.125 inches, more preferably about 0.005 inches to about 0.085 inches, and most preferably about 0.030 inches to about 0.060 inches. The outer diameter of the intermediate layers is preferably between about 1.500 inches and about 1.650 inches, more preferably between about 1.550 inches and about 1.640 inches.

In a preferred embodiment of the present invention, it has been found that improved adhesion between golf ball layers, such as between inner and outer cover layers, can be achieved when low surface energy materials, such as ionomers and/or polyurethanes, are treated with silane coupling agents.

Silane coupling agents have two different types of reactive groups:

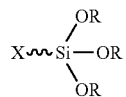

X represents an organofunctional group that reacts with organic materials, such as synthetic resins, and is typically a vinyl, epoxy, amino, methacryl, acryl, isocyanato, or mercapto group; and OR represents the silicon functional group that reacts with inorganic materials and is typically a methoxy, ethoxy, or acetoxy groups.

In the presence of water, coupling agents produce highly reactive silanols which, in turn, condense to form oligomeric structures. In this manner, silanes can form durable chemical "bridges" between materials, facilitating bonding between a low energy surface and a polymer matrix. The silane coupling agent forms a covalent bond with both the polymer matrix and the lower energy surface, thereby making a durable, UV and moisture stable, crosslinked network between the two materials.

Corona/plasma treatment of the low energy surface creates reaction sites (reactive —OH groups) to which the silicon-functional group can bond. Corona discharge/plasma treatment of golf ball cores and layers is disclosed in U.S. application Ser. No. 09/389,058, filed Sep. 2, 1999, which is incorporated herein, in its entirety, by express reference thereto. The silane coupling agent is preferably present in a aqueous bath and the corona-treated substrate, preferably a golf ball core or center (with optional layers), is immersed in the bath. In this manner, the silane is hydrolyzed. One of ordinary skill in the art would be aware that a silane may also be hydrolyzed with ambient moisture. The silane then undergoes a condensation reaction with reactive sites on the substrate surface allowing the coupling agent to be covalently bound to the surface, and the surface is removed from the bath. Excess water on the core surface is allowed to evaporate and the substrate is introduced to a reactive layer component, preferably a polyurethane outer cover layer. The organofunctional group reacts with the layer precursor to complete the "bridge," improving adhesion between the two layers.

Suitable silanes include, but are not limited to, silane esters, such as octyltriethoxysilane, methyltriethoxylsilane, methyltrimethoxysilane, and proprietary nonionic silane dispersing agent; vinyl silanes, such as proprietary, vinyltriethoxysilane, vinyltrimethoxysilane, vinyl-tris-(2-methoxyethoxy) silane, vinylmethyldimethoxysilane; methacryloxy silanes, such as γ-methacryloxypropyltrimethoxysilane; epoxy silanes, such as β-(3,4-epoxycyclohexyl) ethyltrimethoxysilane, γ-glycidoxypropyltrimethoxysilane; sulfur silanes, such as gamma-mercaptopropyltrimethoxysilane proprietary polysulfidesilane, bis-(3-[triethoxisily]-propyl)-tetrasulfane; amino silanes, such as γ-aminopropyltriethoxysilane, γ-aminopropyltriethoxysilane, γ-aminopropyltriethoxysilane, aminoalkyl silicone solution, modified aminoorganosilane, gamma-aminopropyltrimethoxysilane, n-β-(aminoethyl)-γ-aminopropyltrimethoxysilane, modified aminoorganosilane (40% in methanol), modified aminosilane (50% in methanol), triaminofunctional silane, bis-(γ-trimethoxysilylpropyl)amine, n-phenyl-γ-aminopropyltrimethoxysilane, organomodified polydimethylsiloxane, polyazamide silane (50% in methanol), n-β-(aminoethyl)-γ-aminopropylmethyldimethoxysilane; ureido silanes, such as gamma-ureidopropyltrialkoxysilane (50% in methanol), γ-ureidopropyltrimethoxysilane; isocyanate silanes, such as γ-isocyanatopropyltriethoxysilane; and mixtures thereof. Preferably, the silane is an amino silane and more preferably, the amino silane is bis-(γ-trimethoxysilylpropyl) amine.

The silane treatment may be performed alone or in combination with corona discharge and/or plasma treatment. Further, the method of improving adhesion may be combined with a plurality of washing and/or drying steps. Preferably, the surface on which improved adhesion is desired is washed, i.e., the surface of a polybutadiene core on which a NIHS inner cover layer is to be formed. The washing step is optionally followed by a rinsing step but preferably, no rinse step is performed after the first wash. The surface to be treated is then exposed to plasma or corona discharge for a predetermined time, typically from about 1 s to about 2 hours, more preferably less than about 10 min, most preferably from about 10 s to about 1 min. The surface to be treated can be rotated by a predetermined amount to ensure that the maximum surface area is properly exposed to the plasma treatment. Preferably the surface to be treated is rotated by at least about ¼ turn. The surface may optionally undergo surface roughening (of any nature) or gleebar grinding in preparation for receiving the silane.

The surface to be treated is exposed to the silane of choice, preferably an amino silane and more preferably, bis-(γ-trimethoxysilylpropyl)amine, commercially available under the tradename Silquest A-1170 from OSi Specialties of Endicott, N.Y. The silane may be neat or in solution. Preferably, the silane is present in an amount less than about 10%, more preferably less than about 2%. The treated surface is then dried and prepared for final construction into a golf ball. This step may include chilling or preheating a center or a core (and any optional layers thereon), followed by casting of at least one outer layer. Any silane treatment may, optionally, be followed by at least one corona treatment.

Subsequent to silane treatment, the resulting golf ball layer should have a peel strength of at least about 5 lb/in, more preferably at least about 10 lb/in, and most preferably at least about 15 lb/in. The peel strength is measured using, for example, a MTS Sintech® 30/G (or MTS Sintech® 5/G) mechanical test equipment to pull a 0.5-inch-wide section of a golf ball layer apart from the layer/core it is adhered to. The MTS includes a load cell of 100 N (i.e., s/n D72753) and has a crosshead speed of 1.0 in/min. The golf ball is rotatedly secured in a manner such that free rotation remains about a single axis perpendicular to the pull direction. Golf ball movement in other axes is not permitted.

The compositions of the present invention may also include fillers to adjust the density and/or specific gravity of the intermediate layer to a range of from about 0.90 to about 3.00. To increase the density of the NIFS fluoropolymer (typically about 1.80 for Kynar Flex® PVDF), suitable fillers are generally inorganic, and include numerous metals or metal oxides and salts such as tungsten, tungsten carbide, zinc oxide, tin oxide, calcium oxide, barium sulfate, zinc sulfate, calcium carbonate, barium carbonate, zinc carbonate, as well as clay, an array of silicas, regrind (recycled core material typically ground to about 30 mesh particle), high-Mooney-viscosity rubber regrind, and mixtures thereof. Alternatively, fillers having a specific gravity less than that of the NIHS fluoropolymer may be used to reduce the specific gravity of the intermediate layer Such density-reducing fillers include foaming agents, blowing agents, micro balloons, cellular foams and other materials having a relatively large void volume. Typically, such fillers have a specific gravity less than 1.00. Fillers may also include various polymers, ceramics, and glass microspheres that are solid or hollow, and filled or unfilled, all of which are readily selected by one of ordinary skill in the art. The preferred range of specific gravity for golf ball intermediate layers of the present invention is from about 0.90 to about 1.50, more preferably from about 1.20 to about 1.30. The specific gravity of the golf ball depends upon the size of the finished ball and the size and specific gravity of the core, the intermediate layer(s), and the cover.

The NIHS fluoropolymer-based compositions for the intermediate layers of the present invention may be extruded as thin threads and wound about a solid core or a liquid-filled core to form a wound intermediate layer. Preferably the intermediate layer is compression or injection molded about the core. Alternatively, pre-formed intermediate layer half shells are adhered onto the core using an adhesive. For proper adhesion, the adhesives include, but are not limited to, silane coupling agents; two-part adhesive of poly(VDF-HFP) and ketenes; polytetrafluoroethylene; fluoroethylene-propylene; high molecular weight polyethylene and polypropylene; perfluoroacrylate; PVDF; VDF-HFP-TFE terpolymer; polychlorotrifluoroethylene; epichlorohydrin rubber with organic phosphonium; and mixtures thereof. The inner adhesion side of the intermediate layers may be treated to improve wettability by using any suitable conventional processes such as flame treatment, corona treatment, or chemical treatment. These processes tend to convert the surface of the NIHS fluoropolymer intermediate layers from a relatively low energy surface to a high energy, partially oxidized surface, which in turn improves adhesion.

The golf ball cover of the present invention is preferably tough, cut-resistant, and selected from conventional materials used as golf ball covers based on the desired performance characteristics. The cover may comprise one or more layers including an outer cover layer and at least one inner cover layer. These layers may comprise thermoplastic and/or thermosetting materials include, without limitation, partially or fully neutralized ionomer resins; epoxy; polyurethanes comprising polyols and polyisocyanates; balata; vinyl resins; polyolefins; polyureas; polyamides such as poly(hexamethylene adipamide) and poly(caprolactam); acrylic resins and blends thereof; block copolymers such as styrene-butadiene rubber and isoprene- or ethylene-butylene rubber; copoly(ether-amide) such as Pebax®; polyphenylene oxide resins and blends thereof such as Noryl®; thermoplastic polyesters such as Hytrel® and Lomod®; blends and alloys including polycarbonate with acrylonitrile butadiene styrene and polyvinyl chloride with acrylonitrile butadiene styrene; blends of thermoplastic rubbers with polyethylene and propylene; and mixtures thereof. Conventional additives for the cover layer compositions include, but are not limited to, antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; and mixtures thereof. Such additives may be incorporated in any amounts that will achieve their desired purpose.

To minimize water vapor adsorption into the golf ball, it is desirable that the cover of the golf balls has water vapor barrier property. While many WVB materials disclosed in prior art may be incorporated into the cover, it is preferred that the WVB material for golf ball covers of the present invention is a NIHS fluoropolymer as described above. A compatibilizer may be needed to blend the NIHS fluoropolymer with the cover materials mentioned above. Examples of the compatibilizer are described in U.S. Pat. No. 6,274,669, the disclosure of which is incorporated herein by reference in its entirety. The cover may comprise a single cover layer, or an outer cover layer and at least one inner cover layer. In one embodiment of the present invention, at least one of the cover layers is formed from a composition of about 1% to about 99% by weight of a NIHS fluoropolymer, about 10% to about 50% by weight of a thermoplastic or thermosetting material such as an partially or fully neutralized ionomer resin or a polyurethane, and about 0% to about 15% by weight of a compatibilizer. Preferably, the cover of the present invention comprises about 100% of a NIHS fluoropolymer.

Partially- or fully-neutralized ionomer resins for the golf ball covers include copolymers or terpolymers of ethylene and an unsaturated monocarboxylic acid with an optional softening comonomer such as acrylate or methacrylate. The carboxylic acid groups in these ionomers include acrylic, methacrylic, crotonic, maleic, fumaric or itaconic acid partially or fully neutralized by a cation such as lithium, sodium, potassium, zinc, magnesium, calcium, barium, lead, tin, aluminum, or a combination thereof, with lithium, sodium and zinc being preferred. Specific ionomers preferably include ethylene/(meth)acrylic acid, ethylene/(meth) acrylic acid/n-butyl acrylate, ethylene/(meth)acrylic acid/ethyl acrylate, and ethylene/(meth)acrylic acid/methyl acrylate, commercially available as Surlyn® from E. I. Dupont de Nemours and Company, and as Iotek® from Exxon.

Suitable polyurethanes for golf ball covers of the present invention include those disclosed in U.S. Pat. Nos. 6,392,002, 6,371,870 and 6,210,294, incorporated herein by reference in their entirety, and generally comprise the reaction product of at least one polyisocyanate, polyol, and at least one curing agent. Any polyisocyanate available to one of ordinary skill in the art may be used in accordance with the invention, preferably including, but is not limited to, 4,4'-diphenylmethane diisocyanate ("MDI"); polymeric MDI; carbodiimide-modified liquid MDI; 4,4'-dicyclohexylmethane diisocyanate ("H$_{12}$MDI"); p-phenylene diisocyanate ("PPDI"); m-phenylene diisocyanate ("MPDI"); toluene diisocyanate ("TDI"); or a mixture thereof. It is well understood in the art that the hardness of polyurethane is correlated to the percent of unreacted NCO groups in the polyisocyanate. Preferably, the at least one polyisocyanate has less than about 14% unreacted NCO groups, more preferably less than about 7.5%, and more preferably less than about 7.0%.

Any polyol available to one of ordinary skill in the art is suitable for use according to the invention, having saturated or unsaturated bonds, or substituted or unsubstituted aromatic and cyclic groups in the hydrocarbon chain. Exemplary polyols include, but are not limited to, polyether polyols, polyester polyols, polycaprolactone polyols, and polycarbonate polyols. Suitable polyether polyols include, but are not limited to, polytetramethylene ether glycol ("PTMEG"), polyethylene propylene glycol, polyoxypropylene glycol, and mixtures thereof. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. Suitable polycarbonates include, but are not limited to, polyphthalate carbonate and poly(hexamethylene carbonate) glycol. Preferably, the polyol of the present invention includes PTMEG.

The curing agent may be an amine, a hydroxyl-terminated curative, or a mixture thereof. Suitable amine curing agents are primary or secondary amines include, but are not limited to, 4,4'-bis-(sec-butylamino)-dicyclohexylmethane; 1,4-bis-(sec-butylamino)-cyclohexane; 3,5-dimehtylthio-2,4(2,6)-toluenediamine; 3,5-diethyl-2,4(2,6)-toluenediamine; N,N'-dialkyldiamine diphenyl methane; 4,4'-diamino-3,3'-diethyl-5,5'-dimethyl diphenylmethane; 2,2',3,3'-tetrachloro diamino diphenylnethane; trimethylene-glycol-di-p-aminobenzoate; polytetramethyleneoxide-di-p-aminobenzoate; 4,4'-methylene-bis-(2-chloroaniline); 4,4'-methylene-bis-(3-chloro-2,6-diethylaniline) ("MCDEA"); p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); isomers thereof and mixtures thereof. Suitable hydroxyl-terminated curatives are diols, triols, and tetraols that include, but are not limited to, ethylene glycol; diethylene glycol; polyethylene glycol; propylene glycol; polypropylene glycol; polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,3-propane glycol; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Both amine and hydroxyl-terminated curatives can include one or more saturated, unsaturated, halogen, aromatic, cyclic groups. Preferably, the curing agent for the polyurethane cover compositions includes 4,4'-bis-(sec-butylamino)-dicyclohexylmethane (Clearlink® 1000); 1,4-bis-(sec-butylamino)-cyclohexane (Clearlink® 3000); 3,5-dimehtylthio-2,4(2,6)-toluenediamine (Ethacure® 300); 3,5-diethyl-2,4(2,6)-toluenediamine; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol, and mixtures thereof.

In a particularly preferred embodiment of the present invention, saturated ("aliphatic") polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. The cover layers preferably have a Shore D hardness of less than about 72, preferably about 40 to about 72, more preferably about 50 to about 70 and most preferably about 55 to about 65.

It is understood to one of ordinary skill in the art that the NIHS fluoropolymer-based compositions described above for forming intermediate layers in golf ball may also be used, in part or in full, to form any of the cover layers in accordance with the present invention. Furthermore, golf ball coating layers may also comprise one or more of the NIHS fluoropolymers disclosed herein.

The multi-layer golf ball of the invention may have an overall diameter of any size. Although the USGA specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. In another alternative embodiment, the golf balls of the present invention have an overall maximum compression of about 90, preferably about 75 to about 85, more preferably about 80 to about 85 and most preferably about 82.

A representative solid core composition in accordance with the present invention comprises an elastomeric polymer ("base rubber"), a crosslinking agent, and a free radical initiator. The base rubber typically includes natural or synthetic elastomers such as natural rubbers; balata; gutta-percha; synthetic polyisoprenes; styrene-butadiene rubbers; styrene-propylene-diene rubbers; chloroprene rubbers; acrylonitrile rubbers; acrylonitrile-butadiene rubbers; ethylene-propylene-diene terpolymers ("EPDM"); metallocene rubbers, and mixtures thereof. The elastomeric composition may also comprise polypropylene resins; partially or fully neutralized ionomer resins; polyamides; polyesters; urethanes; polyureas; thermosetting or thermoplastic elastomers such as Pebax® (Atofina), Hyrtel® (Dupont) and Kraton® (Shell Chemical); styrene-ethylene block copolymers; maleic anhydride or succinate modified metallocene catalyzed ethylene copolymers; chlorinated polyethylenes; polysulfide rubbers; fluorocarbons; and mixtures thereof.

Preferably, the base rubber comprises at least about 40 pph by weight of at least one polybutadiene synthesized with cobalt, nickel, neodymium, and/or lithium catalysts. The polybutadiene preferably has a cis-1,4 content of at least about 90%, more preferably at least about 95%. Also preferably, the polybutadiene has a Mooney viscosity of at least about 30, a molecular weight of at least about 150,000 and a polydispersity of less than about 4.0. The base rubber may comprise a blend of two or more polybutadiene rubbers having different weight percentages, catalysts, molecular weights, Mooney viscosity, polydispersity, filler contents, crosslinking agent contents, or cis- and trans-isomer contents.

The cross-linking agent may be formed from salts of $\alpha,\beta$-ethylenically unsaturated carboxylic acids having about 3 to about 8 carbon atoms, such as methacrylic, acrylic, cinnamic, crotonic, formanic and maleic acids. Other cross-linking agents include unsaturated vinyl compounds. More preferably, the cross-linking agent is a mono-(meth)acrylic acid or di-(meth)acrylic acid metal salt, wherein the cation is zinc, sodium, magnesium, or mixtures thereof. Even more preferably, the cross-linking agent is zinc diacrylate ("ZDA"), zinc dimethacrylate ("ZDMA"), or mixtures thereof. Of the common acrylate cross-linkers, ZDA has generally been found to produce golf balls with greater initial velocity than ZDMA, therefore, the former is most preferred. The crosslinking agent may be present in an amount from about 0 to about 70 pph of the base rubber. Base rubbers having little or no ZDA has low water vapor transmission rates. They are less prone to moisture absorption and related deterioration in playability and performance because of the low permeability. On the other hand, high levels of ZDA (greater than about 40 pph) provide desirable increases in initial velocity and COR to the base rubber.

Suitable free radical initiators are typically a peroxide, preferably an organic peroxide, and include without limitation dicumyl peroxide; n-butyl-4,4-di(t-butylperoxy)-valerate; 1,1-bis(t-butylperoxy)-3,3,5-trimethylcyclohexane; $\alpha,\alpha'$-bis(t-butylperoxy)-diisopropylbenzene; 2,5-dimethyl-2,5-di(t-butylperoxy)hexane; di-t-butyl peroxide; di-t-amyl peroxide; di(2-t-butyl-peroxyisopropyl)benzene peroxide; lauryl peroxide; benzoyl peroxide; t-butyl hydroperoxide; and mixtures thereof. Preferably, the peroxide initiator is dicumyl peroxide. The free radical initiator, at between about 70% and about 100% activity, is preferably added in an amount ranging between about 0.05 and about 15.0 pph by weight of the base rubber. More preferably, the amount of the initiator added ranges between about 0.1 and about 5.0 pph, and most preferably between about 0.25 and about 1.50 pph. The initiator may alternatively or additionally be one or more of electron beams; gamma radiation; infrared radiation; ultra-violet radiation; X-ray radiation; or any other high-energy radiation source capable of generating free radicals. Additives for the free radical initiators include free radical scavengers, scorch retarders, stable free radicals, sulfur-based curing agents with optional accelerators, and mixtures thereof.

The polybutadiene rubber may be mixed with a cis-to-trans catalyst and an optional accelerator during molding to increase resilience and/or decrease compression of the golf ball cores formed therefrom. Suitable materials for the cis-to-trans catalyst and accelerator are disclosed in U.S. Pat. Nos. 6,291,592 and 6,162,135, the disclosures of which are incorporated herein by reference in their entirety. Other core additives well known to the skilled artisan include fillers to adjust the density and/or specific gravity of the core, antioxidants to prevent the breakdown of the base rubber, processing aids, processing oils, plasticizers, dyes and pigments.

In a preferred embodiment, the present invention is directed to an improved multi-layer golf ball which comprises a core, a cover, and at least one intermediate layer disposed between the core and the cover. Preferably, the core has a compression ranging from about 10 to about 100. The core preferably has a diameter of about 1.00 inch to about 1.65 inches, more preferably about 1.25 inches to about 1.60 inches, and most preferably about 1.40 inches to about 1.58 inches. The cover is formed of one or more layers including inner and outer cover layers. It is preferred that a finished golf ball made with such a core has a COR of greater than about 0.75, more preferably about 0.78 to about 0.85 and most preferably about 0.79 to about 0.82.

Manufacturing of the golf balls of the present invention may utilize any conventional processes employed in the golf ball art. For example, the solid cores can be either injection or compression molded. The intermediate layer is subsequently cast, melt extruded, injection molded, compression molded, heat shrink-wrapped, or spin-coated about the core. It is important that the intermediate layer material be able to sustain the temperatures applied during the application of the cover layer. The cover layer or layers are then injection or compression molded or cast about the intermediate layer. The intermediate layers and the cover layers may also be molded around any solid core by a reaction product injection molding process as described in U.S. Pat. Nos. 6,392,002 and 6,371,870, which are incorporated herein, in their entirety, by express reference hereto.

The invention, with respect to golf ball compositions comprising non-ionomeric fluoropolymers will now be described in more detail with respect to the following non-limiting examples:

EXAMPLES

Sample intermediate layers of the present invention were molded over polybutadiene cores having an outer diameter of 1.550 inches, an ATTI compression of 73, and a COR of 0.796. The composition of the cores is: 100 pph polybutadiene rubber (Bayer® CB-23); 25.5 pph zinc diacrylate (Sartomer® SR-526); 0.5 pph peroxide initiator; 5.3 pph zinc oxide; 10.5 pph density-modifying filler (tungsten); 2.0 pph processing aids; and 0.2 pph color pigment. The intermediate layers all had a thickness of 0.035 inches.

Compositions of the intermediate layers and their respective performance properties are listed in Table II below.

TABLE II

Golf ball intermediate layers formed of non-ionomeric fluoropolymers

| Composition | Control | Example 1 | Example 2 | Example 3 | Example 4 |
|---|---|---|---|---|---|
| Surlyn ® 7940 | 50% | | | | |
| Surlyn ® 8940 | 50% | | | | |
| Kynar Flex ® 2900-04 | | 100% | | | |
| Kynar Flex ® 2850-04 | | | 100% | | |
| Kynar Flex ® 3120-10 | | | | 100% | 75% |
| Kynar Flex ® 2950-10 | | | | | 25% |
| Properties | | | | | |
| ATTI Compression | 79 | 80 | 93 | 89 | 83 |
| COR @ 125 ft/s | 0.804 | 0.795 | 0.806 | 0.777 | 0.796 |
| Water Absorption | >0.5% | <0.05% | <0.05% | <0.05% | <0.07% |

According to the data tabulated above, the intermediate layers formed from various non-ionomeric fluoropolymers (Kynar Flex®) in particular) significantly reduced the water absorption in the samples in comparison with the Surlyn® ionomer based intermediate layer in the controls. Specifically, the reduction in water absorption was at least one order of magnitude greater. This improvement is desirable in golf balls to prolong their shelf life and to enhance their durability. Other performance properties of the samples were comparable to the controls. In particular, while the ATTI compression of the samples was slightly increased, there was no significant loss in COR.

A retractable pin injection molding technique was used to mold a non-ionic hydrophobic stiff layer having a higher melt flow (i.e., lower melt viscosity of 10 KPoise at 230° C.) copolymer of tetrafluoroethylene with hexafluoropropylene over surface-treated cores using a heated (140° F.–200° F.) mold. Molded casings were subjected to conventional finishing processes prior to testing. The results are presented below in Table III.

TABLE III

Durability of Treated v. Untreated Cores

| Inner Layer Composition | COR at 125 ft/s - untreated cores | COR at 125 ft/s - silane surface treated cores |
|---|---|---|
| Kynar ® RC-01-134 | No data - layers broke due to poor adhesion | 0.793 |
| Visual observation → | Layer cracked randomly and, in some cases, at the flow lines | No visual surface cracking |

All patents and patent applications cited in the foregoing text are expressly incorporated herein by reference in their entirety.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
a core having a first outer surface;
a cover; and
an intermediate layer disposed between the core and the cover, the intermediate layer comprising a high melt flow non-ionic hydrophobic stiff fluoropolymer comprising a copolymer of tetrafluoroethylene and hexafluoropropylene having a melt viscosity of 10 KPoise or less at 230° C., a surface energy of less than about 75 dyne/cm$^2$ and having a second outer surface;
wherein at least one of the first or second outer surfaces are treated with an functional silane such that a sufficient number of surface amine, hydroxyl, carboxylic acid, or epoxy groups are available for binding to an adjacent layer; and wherein the intermediate layer has a specific gravity of 1.3 to about 1.6 measured in the absence of a density-adjusting filler.

2. The golf ball of claim 1, wherein the functional silane is an aminosilane that forms surface amine groups for binding.

3. The golf ball of claim 1, wherein the non-ionic hydrophobic stiff fluoropolymer has a surface energy of less than about 50 dyne/cm$^2$.

4. The golf ball of claim 1, wherein the non-ionic hydrophobic stiff fluoropolymer has a surface energy of less than about 40 dyne/cm$^2$.

5. The golf ball of claim 1, wherein the non-ionic hydrophobic stiff fluoropolymer is a homopolymer, copolymer, or terpolymer formed from a polymerization of one or more non-ionic fluoromonomers.

6. The golf ball of claim 1, wherein the intermediate layer further comprises a thermoplastic material comprising polyesterester block copolymers, polyetherester block copolymers, polyetheramide block copolymers, partially or fully neutralized ionomer resins, dynamically vulcanized thermoplastic elastomers, hydrogenated styrene-butadiene elastomers with functional groups attached, thermoplastic polyurethanes, thermoplastic polyesters, metallocene polymers; styrene-propylene-diene rubbers; polybutadienes; chloroprene rubbers; acrylonitrile rubbers; acrylonitrile-butadiene rubbers; ethylene/propylene/diene terpolymers; polypropylene resins; epoxy; polyurea; styrene-ethylene block copolymers; maleic anhydride or succinate modified metallocene catalyzed ethylene copolymers; chlorinated polyethylenes; polysulfide rubbers; fluorocarbons; or polymethylmethacrylate.

7. The golf ball of claim 1, wherein the adjacent layer is the core or the cover.

8. The golf ball of claim 1, wherein the non-ionomeric fluoropolymer has a material hardness between about 25 and about 75 Shore D.

9. The golf ball of claim 8, wherein the non-ionomeric fluoropolymer of the intermediate layer has a material hardness of between about 50 and about 70 Shore D.

10. The golf ball of claim 1, wherein the intermediate or cover layer has a thickness between about 0.005 inches and about 0.085 inches.

11. The golf ball of claim 10, wherein the intermediate or cover layer has a thickness between about 0.030 inches and about 0.060 inches.

12. The golf ball of claim 1, wherein the golf ball has an outer diameter between about 1.500 inches and about 1.650 inches.

13. The golf ball of claim 1, wherein the golf ball has an outer diameter between about 1.550 inches and about 1.640 inches.

14. The golf ball of claim 1, wherein the core comprises a center and at least one outer core layer.

15. The golf ball of claim 1, wherein the center is solid, hollow, liquid-filled, gel-filled, or gas-filled.

16. The golf ball of claim 1, wherein the aminosilane comprises γ-aminopropyltriethoxysilane; γ-aminopropyltriethoxysilane; γ-aminopropyltriethoxysilane; aminoalkyl silicone solution; modified aminoorganosilane; γ-aminopropyltrimethoxysilane; n-β-(aminoethyl)-γ-aminopropyltrimethoxysilane; modified aminoorganosilane (40% in methanol); modified aminosilane (50% in methanol); triaminofunctional silane; bis-(γ-trimethoxysilylpropyl) amine; n-phenyl-γ-aminopropyltrimethoxysilane; organo-modified polydimethylsiloxane; polyazamide silane (50% in methanol); or n-β-(aminoethyl)-γ-aminopropylmethyldimethoxysilane.

17. The golf ball of claim 16, wherein the aminosilane is n-β-(aminoethyl)-γ-aminopropyltrimethoxysilane.

18. The golf ball of claim 1, wherein the cover comprises a castable or non-castable thermoplastic or thermosetting material comprising partially- or fully-neutralized ionomer resins; epoxy; polyurethanes comprising polyols and polyisocyanates; balata; vinyl resins; polyolefins; polyureas; polyamides; acrylic resins and blends thereof; block copolymers; copoly(ether-amide); polyphenylene oxide resins and blends thereof; thermoplastic polyesters; blends and alloys including polycarbonate with acrylonitrile butadiene styrene and polyvinyl chloride with acrylonitrile butadiene styrene; blends of thermoplastic rubbers with polyethylene and propylene; or a mixture thereof.

19. The golf ball of claim 1, wherein the core has a Shore D hardness of less than about 60.

20. The golf ball of claim 1, wherein the cover comprises at least one additive comprising antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; or a mixture thereof.

21. The golf ball of claim 1, where the non-ionic hydrophobic stiff fluoropolymer has a water absorption at 20° C. immersion for 24 hr of no greater than about 0.07%.

22. A golf ball comprising:
a core having a first outer surface;
a cover; and
an intermediate layer disposed between the core and the cover, the intermediate layer comprising a high melt flow non-ionic hydrophobic stiff fluoropolymer comprising a copolymer of tetrafluoroethylene and hexafluoropropylene having a melt viscosity of 10 KPoise or less at 230° C., a surface energy of less than about 55 dyne/cm$^2$, a water absorption at 20° C. immersion for 24 hr of less than about 0.1%, and having a second outer surface;
wherein at least one of the first or second outer surfaces are treated with an aminosilane such that a sufficient number of surface amine groups are present and result in the treated layer having a peel strength of at least about 5 lb/in; and wherein the intermediate layer has a specific gravity of 1.3 to about 1.6 measured in the absence of a density-adjusting filler.

23. The golf ball of claim 22, wherein the peel strength is at least about 10 lb/in.

24. The golf ball of claim 23, wherein the peel strength is at least about 15 lb/in.

25. The golf ball of claim 22, wherein the aminosilane comprises γ-aminopropyltriethoxysilane; γ-aminopropyltriethoxysilane; γ-aminopropyltriethoxysilane; aminoalkyl silicone solution; modified aminoorganosilane; γ-aminopropyltrimethoxysilane; n-β-(aminoethyl)-γ-aminopropyltrimethoxysilane; modified aminoorganosilane (40% in methanol); modified aminosilane (50% in methanol); triaminofunctional silane; bis-(γ-trimethoxysilylpropyl) amine; n-phenyl-γ-aminopropyltrimethoxysilane; organo-modified polydimethylsiloxane; polyazamide silane (50% in methanol); or n-β-(aminoethyl)-γ-aminopropylmethyldimethoxysilane.

26. A golf ball comprising:
a core having a first outer surface;
a cover; and
an intermediate layer disposed between the core and the cover, the intermediate layer comprising a high melt flow non-ionic hydrophobic stiff fluoropolymer comprising a copolymer of tetrafluoroethylene and hexafluoropropylene having a melt visosity of 10 KPoise or less at 230 ° C., a surface energy of no greater than about 55 dyne/cm$^2$, a coefficient of friction of less than about 0.55, and having a second outer surface;
wherein at least one of the first or second outer surfaces are treated with n-β-(aminoethyl)-γ-aminopropyltrimethoxysilane in an amount sufficient to result in a peel strength between treated layers of at least about 10 lb/in; and wherein the intermediate layer has a specific gravity of 1.3 to about 1.6 measured in the absence of a density-adjusting filler.

27. The golf ball of claim 26, wherein the coefficient of friction of less than about 0.45.

* * * * *